United States Patent
Follestad et al.

(10) Patent No.: US 7,332,543 B2
(45) Date of Patent: Feb. 19, 2008

(54) POLYOLEFIN COMPOSITION FOR ROTOMOLDING

(75) Inventors: Arild Follestad, Stathelle (NO); Espen Ommundsen, Langesund (NO); Knut Fosse, Skien (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/469,601

(22) PCT Filed: Mar. 1, 2002

(86) PCT No.: PCT/GB02/00904

§ 371 (c)(1), (2), (4) Date: Jan. 13, 2004

(87) PCT Pub. No.: WO02/070602

PCT Pub. Date: Sep. 12, 2002

(65) Prior Publication Data

US 2004/0116608 A1 Jun. 17, 2004

(30) Foreign Application Priority Data

Mar. 1, 2001 (EP) .................................. 01301873

(51) Int. Cl.
C08L 23/00 (2006.01)
C08L 23/04 (2006.01)
(52) U.S. Cl. ........................... 525/191; 525/240
(58) Field of Classification Search ............ 525/191, 525/240
See application file for complete search history.

(56) References Cited

U.S. PATENT DOCUMENTS

| | | | | |
|---|---|---|---|---|
| 4,871,811 A * | 10/1989 | Gaku et al. | ................. | 525/148 |
| 5,382,631 A | 1/1995 | Stehling et al. | | |
| 5,506,056 A * | 4/1996 | Yoshihara | ................. | 428/409 |
| 5,858,491 A * | 1/1999 | Geussens et al. | .......... | 428/36.9 |
| 6,111,023 A | 8/2000 | Chum et al. | | |
| 6,270,891 B1 * | 8/2001 | Maugans et al. | ........... | 428/364 |
| 6,306,969 B1 * | 10/2001 | Patel et al. | ................. | 525/191 |
| 6,388,007 B1 * | 5/2002 | Nakatsukasa et al. | ......... | 525/57 |
| 6,391,461 B1 * | 5/2002 | Ryntz et al. | ............. | 428/424.8 |
| 6,417,271 B1 * | 7/2002 | Nishihara et al. | ........... | 525/105 |
| 6,451,897 B1 * | 9/2002 | Niyogi | ....................... | 524/445 |
| 6,497,965 B1 * | 12/2002 | Longmoore et al. | ........ | 428/515 |
| 6,630,538 B1 * | 10/2003 | Ellul et al. | ................... | 525/194 |
| 6,733,717 B1 * | 5/2004 | Marczinke et al. | ......... | 264/532 |
| 6,767,600 B1 * | 7/2004 | Kasahara | .................... | 428/35.6 |
| 2001/0016627 A1 * | 8/2001 | Koshirai et al. | ............ | 525/192 |
| 2003/0153695 A1 * | 8/2003 | Braganca et al. | ............. | 526/68 |
| 2004/0074571 A1 * | 4/2004 | Adkins et al. | .............. | 148/549 |

FOREIGN PATENT DOCUMENTS

| | | |
|---|---|---|
| AU | 21280 99 A | 9/1999 |
| EP | 0 389 611 B1 | 6/1997 |
| EP | 0 523 416 B1 | 10/1999 |
| WO | 96/14358 | 5/1996 |

OTHER PUBLICATIONS

Database WPI, Derwent Publications Ltd., London, GB; AN 1996-045404, XP002172829 & JP 07 309909 A, Nov. 28, 1995.
"Plastics—Determination of the Melt Mass-Flow Rate (MFR) and the Melt Volume-Flow Rate (MVR) of Thermoplastics", ISO 1133, Third Edition, Jan. 15, 1997.

* cited by examiner

Primary Examiner—Nathan M. Nutter
(74) Attorney, Agent, or Firm—Nixon & Vanderhye P.C.

(57) ABSTRACT

A polymer composition suitable for rotomoulding comprising I) An ethylene homopolymer or copolymer with at least one other C3-10 ? olefin, having a melt flow rate of 0.5 to 30, a molecular weight distribution (Mw/Mn) of less than 4, an Mw of 50,000 to 110,000, a density of 0.940 g/cm3 to 0.970 g/cm3 and a melting point of 100 to 145° C.; or I) a propylene homopolymer or copolymer with at least one other C2-10 ? olefin, having a melt flow rate of 0.5 to 30, a molecular weight distribution (Mw/Mn) of less than 4, an Mw of 150,000 to 300,000, and a melting point of 100 to 170° C.; and II) an ethylene homo or copolymer with at least one other C3-10 ?-olefin, having a melt flow rate of within 40% of the melt flow rate of component (I), a molecular weight distribution of (Mw/Mn) of less than 4, an Mw of within 30% of the Mw of component (I), a density of 0.880 g/cm3 to 0.940 g/cm3 said density being at least 0.010 g/cm3 less than the density of component (I) and a melting point of at least 5° C. less than that of component (I); or II) a propylene homo or copolymer with at least one other C2-10 ?-olefin having a melt flow rate of within 40% of the melt flow rate of component (I), a molecular weight distribution of (Mw/Mn) of less than 4, an Mw of within 30% of the Mw of component (I), and a melting point of at least 10° C. less than that of component (I).

16 Claims, 2 Drawing Sheets

POLYOLEFIN COMPOSITION FOR ROTOMOLDING

This application is the US national phase of international application PCT/GB02/00904 filed 1 Mar. 2002, which designated the US.

This invention relates to the use of a particular polymer composition in for example, rotational moulding as well as to the polymer composition itself, to rotomoulding processes using the same and to rotomoulded articles made from the polymer composition. More specifically, the invention concerns the use of a polymer composition which comprises at least two components formed by single site catalysis having particular molecular weight distributions, comonomer compositions and densities.

Rotational moulding is a moulding process in which a particulate polymer, the moulding powder, is filled into a mould which is placed into an oven and rotated so that the polymer melts and coats the inside surface of the mould. In order to ensure that the moulded product is defect free, the moulding powder must have a relatively small particle size and should preferably be uniform in particle size and composition. Where, as is normal, the moulding powder has to contain colouring agents or other additives, e.g. stabilisers, the moulding powder is conventionally produced by grinding polymer pellets extruded from stabilised reactor grain powder to the correct particle size for rotation of moulding, usually this the colours or other additives being added in with the polymer pellets are mixed into the ground and moulding powder.

A wide variety of articles may be prepared by rotational moulding. In particular rotational moulding is used in the manufacture of large objects such as liquid containers, e.g. tanks, boats, as well as in a large number of household areas, e.g. in the manufacture of toys.

The nature of the polymer rotomoulded depends very much on the nature of the article to be made. For example, if a chemical tank is being made, then the polymer used should be one which is not degraded by the chemical and one which has particular mechanical properties so that the container does not break under stress. Polymers used for the manufacture of toys must be completely non-toxic and again must be strong to prevent breakage. Articles for outdoor use such as boats must also be resistant to degradation from by the elements, e.g. sunlight, rain, frost or seawater. The mechanical properties of the rotomoulding powders are therefore critical.

Another important property is rheology and it is also critical that this is favourable. Rheology is a measure of non-Newtonian solid flow and it is crucial that flow be within certain limits to ensure that product properties are ideal.

Moreover, when making objects where a well defined shape is required, it is also desired that the eventual rotomoulded product does not warp, i.e. that the sides of a product remain undistorted.

A variety of polymers may be successfully rotomoulded although homo and copolymers of ethylene and homo and copolymers of propylene may in particular be mentioned. However, the nature of the catalyst used to make the polymer has a significant bearing on the rotomouldability of the polymer.

In rotomoulding, polymers produced from single site catalysts give rise to products having excellent mechanical properties and enable rotomoulding to be carried out over a much shorter period of time. Polymers produced from single site catalysts tend to have a narrow molecular weight distribution and copolymers produced from single site catalysts tend to have narrow comonomer distribution. These properties gives rise to increased environmental stress cracking resistance and improvements in other mechanical properties.

However, the narrow distribution of comonomers as compared to a Ziegler-Natta produced polymer, results in a much narrower melting and crystallisation behaviour. The sharp melting behaviour makes the polymer very sensitive to processing temperature and, without wishing to be limited by theory, it is believed that this causes severe warpage in rotomoulding products. Hence, the mechanical property benefits of using a polymer made by single site catalysis are offset by increased warpage.

Polymers produced using Ziegler-Natta catalysts have much broader melting/crystallisation windows than polymers made by single site catalysis and hence tend to produce rotomoulding products with much less warpage. However, due to the broad comonomer distribution and broad molecular weight distribution mechanical properties, especially ESCR and rheology are not so favourable.

There still remains therefore, the need to find a polymer suitable for rotational moulding that can give rise to products having both low warpage and excellent rheological and mechanical properties.

It has now been surprisingly found that by forming, e.g. blending, a particular mix of polymers, preferably made by single site catalysis a polymer composition may be produced which not only has excellent mechanical and rheological properties but also does not warp after rotomoulding since its processing window is broadened. A blend of polymers having, depending on the monomers involved, similar molecular weights and similar melt flow rates but different densities, melting points or comonomer distributions has surprisingly been found to give rise to a composition which shows an overall narrow molecular weight distribution and hence excellent mechanical and Theological properties and has a broadened processing window which eliminates warpage normally associated with single site materials.

Hence, viewed from one aspect the invention provides a polymer composition suitable for rotomoulding comprising I) a first ethylene homo or copolymer with at least one other $C_{3-10}$ α-olefin, having a melt flow rate (MFR) of 0.5 to 30, preferably 3 to 15, especially 6 to 8, a molecular weight distribution (Mw/Mn) of less than 4, preferably less than 3.5, especially less than 3, an Mw of 50,000 to 110,000, a density of 0.940 g/cm³ to 0.970 g/cm³ and a melting point of 100 to 145° C.; OR I) a propylene homo or copolymer with at least one other $C_{2-10}$ α-olefin, having a melt flow rate of 0.5 to 30, preferably 3 to 15, especially 6 to 8, a molecular weight distribution (Mw/Mn) of less than 4, preferably less than 3.5, especially less than 3, an Mw of 150,000 to 300,000, and a melting point of 100 to 170° C.; and II) a second ethylene homo or copolymer with at least one other $C_{3-10}$ α-olefin, having a melt flow rate of within 40%, preferably 20% of the melt flow rate of component (I), a molecular weight distribution of (Mw/Mn) of less than 4, an Mw of within 30%, preferably 20% of the Mw of component (I), a density of 0.880 g/cm³ to 0.940 g/cm³ said density being at least 0.010 g/cm³ less than the density of component (I) and a melting point of at least 5° C., preferably at least 10° C. less than that of component (I); OR II) a propylene homo or copolymer with at least one other $C_{2-10}$ α-olefin having a melt flow rate of within 40%, preferably 20% of the melt flow rate of component (I), a molecular weight distribution of (Mw/Mn) of less than 4, an Mw of within 30%, preferably 20% of the Mw of component (I), and a melting point of at least 10° C. less than that of component (I).

Viewed from another aspect the invention provides a polymer composition suitable for rotomoulding comprising as hereinbefore described wherein said composition has a molecular weight distribution (Mw/Mn) of less than 4, an Mw of within 30%, preferably 20% of the Mw of component (I), and an Mn within 30%, preferably 20% of the Mw of component (I).

In an especially preferred embodiment, the invention provides a polymer composition suitable for rotomoulding comprising I) an ethylene homopolymer having a melt flow rate of 0.5 to 30, preferably 3 to 15, especially 6 to 8, a molecular weight distribution (Mw/Mn) of less than 4, preferably less than 3.5, especially less than 3, an Mw of 50,000 to 110,000, a density of 0.940 $g/cm^3$ to 0.970 $g/cm^3$ and a melting point of 100 to 145° C.; and II) an ethylene copolymer with at least one $C_{3-10}$ α-olefin having a melt flow rate of within 40%, preferably 20% of the melt flow rate of component (I), a molecular weight distribution of (Mw/Mn) of less than 4, an Mw of within 30%, preferably 20% of the Mw of component (I), a density of 0.880 $g/cm^3$ to 0.940 $g/cm^3$, preferably 910 $g/cm^3$ to 0.930 $g/cm^3$ said density being at least 0.010 $g/cm^3$ less than the density of component (I) and a melting point of at least 10° C. less than that of component (I).

Viewed from another aspect the invention provides the use of a polymer composition as hereinbefore described in rotomoulding.

Viewed from yet another aspect the invention provides a process for the preparation of an article comprising rotomoulding a composition as herein before defined.

Viewed from yet another aspect the invention provides an article comprising a polymer composition as hereinbefore described, especially a rotomoulded article.

Viewed from yet another aspect the invention provides a process for the preparation of a polymer composition as hereinbefore described wherein said composition is produced in at least two reactors in cascade or parallel, e.g. two slurry phase reactors or two gas phase reactors, especially a slurry phase followed by gas phase reactor.

Viewed from another aspect the invention provides a process for the preparation of a polymer composition as hereinbefore described comprising blending components (I) and (II) in conventional blending apparatus, preferably a micropellet extruder.

Viewed from another aspect the invention provides a process for the preparation of a polymer composition as hereinbefore described said process comprising the use of at least two catalysts, preferably metallocene catalysts, e.g. a dualsite catalyst preferably a dualsite metallocene catalyst.

Unless otherwise stated densities are measured according to ISO 1183-1987(E). MFR is measured according to ISO 1133-1997 (D-for PE/M for PP). The melting point of polyethylene is measured by heating the polymer from room temperature to 200° C. at a heat rate of 10° C./min. Thee polymer is maintained at 200° C. for 5 mins and then cooled to −10° C. at a cool rate of 10° C./min and maintained at −10° C. for 1 minute. The polymer is then heated to 200° C. at a heat rate of 10° C./min and the melting point is taken on this second heat run. For polypropylene the procedure is identical except that heating takes place to 225° C. and cooling is effected to 20° C. GPC analyses were carried out under the following conditions:

Equipment: Waters 150 CV plus no. 1115
Detector: Refractive Index (RI) and Viscosity detector
Calibration: Narrow molecular weight distribution PS
1. Columns: 3×HT6E styragel from Waters (140° C.).

Components (I) and (II) may be copolymers of ethylene or propylene with at least one other $C_{2-10}$ α-olefin. Suitable comonomers include ethylene, propylene, 1-butene, 1-hexene, 1-octene etc. Clearly, ethylene is only a suitable comonomer when the major monomer is propylene and propylene is only a suitable comonomer where the major monomer is ethylene. Diolefins may also be employed as comonomers especially those having two terminal double bonds, e.g. butadiene. In a preferred embodiment, where component (I) or (II) is a copolymer, it is a copolymer of ethylene with octene, butene or hexene, especially butene or hexene.

Component (I) or (II) may also be a homopolymer of propylene having no or only a few crystallinity disrupting units, e.g. less than 5 units per 100 propylene linkages. By crystallinity disrupting units it is meant a unit that disrupts the regular structure of the polymer, i.e. an atactic unit in syndiotactic or isotactic propylene polymers. In one embodiment, both components (I) and (II) should be propylene homopolymers in which component (I) is preferably a syndiotactic or isotactic propylene component and component (II) is preferably an amorphous propylene homopolymer. In a less preferred embodiment component (I) may be a polypropylene homopolymer and component (II) may be a propylene copolymer.

In another less preferred embodiment both components may be ethylene homopolymers in which component (II) comprises a high degree of short chain branching.

In a final and most preferred embodiment, component (I) may be an ethylene homopolymer and component (II) may be an ethylene copolymer.

The polymer components (I) and (II) should preferably have similar melt flow rates, i.e. the melt flow rate of component (II) should not differ from the melt flow rate of component (I) by greater than 40%, e.g. 20%, preferably no more than 10%, especially no more than 5%. The melt flow rate of the components should be in the range 0.5 to 30, preferably 1 to 20, more preferably 3 to 15, e.g. 4 to 10, especially 6 to 8, most especially about 6. In a highly preferred embodiment both components (I) and (II) have a MFR of about 6.

The melt flow rate of the entire composition should also be in the range 0.5 to 30, preferably 1 to 20, more preferably 2 to 15, e.g. 4 to 10, especially 6 to 8, most especially about 6.

The molecular weight distribution (MWD) of both components should be approximately the same, e.g. within 10%, and the MWD must be narrow, e.g. an (Mw/Mn) of less than 4, preferably less than 3.5, especially less than 3. The MWD of the entire composition should also preferably be less than 4, especially less than 3.5.

Whilst the Mw and Mn ranges may vary within wide limits the Mw/Mn ratio remains low, i.e. less than 4. In a preferred embodiment the Mw and Mn of both components are also similar. For a polyethylene homopolymer or copolymer suitable Mw values are in the range 50000 to 110000, especially 65000 to 85000. For a propylene homopolymer or copolymer suitable Mw values are Mw of 150,000 to 300,000. The Mw of component (II) should be within 30%, preferably 20% of the Mw of component (I).

For compositions based on ethylene, the densities of the two components should be different, i.e. component (II) should have a density at least 0.010 $g/cm^3$, especially 0.020 g/cm³ different from component (I). For ethylene homo and copolymers, preferably component (I) should have a density in the range 0.940 to 0.970 g/cm³ and component (II) should have a density in the range of 0.880 to 0.940 g/cm³, preferably in the range 0.910 g/cm³ to 0.930 g/cm³, said density preferably being at least 0.010 g/cm³ less than the density of component (I).

For compositions based on ethylene, the density of the entire composition is preferably in the range 0.925 to 0.50 g/cm³, preferably 930 to 0.940 g/cm³.

The two components must also have different crystallinity properties, i.e. components (I) and (II) should have different melting points. This may be achieved by providing copolymers with differing comonomer contents or for a composition containing only homopolymers by providing a polymer having differing numbers of crystallinity disrupting units (e.g. short chain branches).

Where component (I) is an ethylene homo or copolymer it may have a melting point of 100 to 145° C. Where component (I) is a propylene copolymer or propylene homopolymer it should have a melting point of 100 to 170° C.

Component (II) should have a melting point which differs from that of component (I) by at least 5° C., preferably at least 10° C., especially at least 20° C. In the case of a propylene homopolymer, component (II) may also be amorphous and may therefore have no defined melting point. Such a structure is deemed to have a melting point at least 10° C. less than (and in effect infinitely less) than component (I).

Thus an especially preferred composition according to the invention is a composition in which component (I) is an ethylene homopolymer having an MFR of 6 to 8, a molecular weight distribution of less than 3, an Mw of 65,000 to 100,000, an Mn of 20,000 to 60,000, a density of 0.945 to 0.970 g/cm³ and a melting point of 125 to 135° C.; and component (II) is an ethylene copolymer with hexene having an MFR of 6 to 8, a molecular weight distribution of less than 3, an Mw of 65,000 to 100,000, an Mn of 20,000 to 60,000, a density of 0.910 to 0.940 g/cm³ and a melting point of 100 to 125° C.

In order to prepare the required polymer for rotomoulding, components (I) and (II) may be blended using conventional blending or compounding technology. The components (I) and (II) may be mixed in any convenient ratio to ensure that the desired properties are obtained. Preferably however, the ratio of component (I) to (II) is from 95:5 to 5:95, preferably 9:1 to 1:9, especially 4:1 to 1:4, more especially 1:2 to 2:1.

Components (I) and (II) may also be used in conjunction with other polymers in the blend such as rotomoulding polymer grades and some Ziegler-Natta polymers. Moreover, it is within the scope of the invention to use a further-polymer component (III) which also has a MWD and MFR similar to components (I) and (II) but has a still different comonomer distribution hence producing a multimodal comonomer distribution.

The polymer composition described above gives rise to rotomoulded articles with excellent mechanical and rheological properties and low warpage.

The components are preferably produced using a single site catalyst, e.g. metallocene catalyst or potentially a dual-site catalyst. However, where component (I) or (II) is a homopolymer Ziegler-Natta catalysis may be employed. This is not however, preferred. Suitable metallocene catalysts for use in the invention may be any conventional metallocene catalyst. As used herein, the term metallocene is used to refer to all catalytically active metal:η-ligand complexes in which a metal is complexed by one, two or more open chain or closed ring η-ligands. The use of bridged bis-η-ligand metallocenes, single η-ligand "half metallocenes", and bridged η-σ ligand "scorpionate" metallocenes is particularly preferred. The metal in such complexes is preferably a group 4A, 5A, 6A, 7A or 8A metal or a lanthanide or actinide, especially a group 4A, 5A or 6A metal, particularly Zr, Hf or Ti. The η-ligand preferably comprises an $\eta^4$ or $\eta^5$ open chain or an $\eta^5$-cyclopentadienyl ring, optionally with a ring or chain carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Suitable η-ligands, include those of formula II discussed above. Examples of such homo or heterocyclic cyclopentadienyl ligands are well known in the art (see e.g. EP-A-416815, WO96/04290, EP-A-485821, EP-A-485823, U.S. Pat. No. 5,276,208 and U.S. Pat. No. 5,145,819).

Besides the η-ligand, the metallocene complex used according to the invention may include other ligands; typically these may be halide, hydride, alkyl, aryl, alkoxy, aryloxy, amide, carbamide or other two electron donor groups. Any hydrocarbyl ligand here will generally contain up to 20 carbons, preferably up to 10 carbons, e.g. up to 6 carbons.

Metallocene catalysts are conventionally employed in the presence of a cocatalyst. Suitable cocatalysts are well known and include alkyl metal compounds, in particular alumoxanes. Suitable alumoxanes include $C_{1-10}$ alkyl alumoxanes, e.g. methyl alumoxane (MAO) and isobutyl alumoxanes (e.g. tetra and hexaisobutyl alumoxane, TIBAO and HIBAO), especially MAO. Alumoxane co-catalysts are described by Hoechst in WO-A-94/28034. These are considered cyclic or cage like oligomers having up to 40, preferably 3 to 20, —[Al(R")O]— repeat units (where R" is hydrogen, $C_{1-10}$ alkyl, preferably methyl, or $C_{6-18}$ aryl or mixtures thereof).

If desired the metallocene or metallocene/cocatalyst mixture may be used in unsupported form or it may be precipitated and used as such. However the metallocene or its reaction product with the cocatalyst is preferably introduced into the polymerization reactor in supported form, e.g. impregnated into a porous particulate support, as is well known in the art.

The particulate support material used is preferably an organic or inorganic material, e.g. a polymer (such as for example polyethylene, polypropylene, an ethylene-propylene copolymer, another polyolefin or polystyrene or a combination thereof). Such polymeric supports may be formed by precipitating a polymer or by a prepolymerization, eg of monomers used in the polymerization for which the catalyst is intended. However, the support is especially preferably a metal or pseudo metal oxide such as silica, alumina or zirconia or a mixed oxide such as silica-alumina, in particular silica, alumina or silica-alumina.

Especially preferably the support is a porous material so that the metallocene may be loaded into the pores of the support, e.g. using a process analogous to those described in WO94/14856 (Mobil), WO95/12622 (Borealis) and WO96/

00243 (Exxon). The particle size is not critical but is preferably in the range 5 to 200 μm, more preferably 10 to 80 μm.

Before loading, the particulate support material is preferably calcined, i.e. heat treated, preferably under a non-reactive gas such as nitrogen. This treatment is preferably at a temperature in excess of 100° C., more preferably 200° C. or higher, e.g. 200-800° C., particularly about 300° C. The calcination treatment is preferably effected for several hours, e.g. 2 to 30 hours, more preferably about 10 hours.

A cocatalyst, e.g. an alumoxane or an ionic catalyst activator (such as a boron or aluminium compound, especially a fluoroborate) may also be mixed with or loaded onto the catalyst support material. This may be done subsequently or more preferably simultaneously to loading of the metallocene, for example by including the cocatalyst in the solution of the metallocene or, by contacting the metallocene loaded support material with a solution of the cocatalyst or catalyst activator, e.g. a solution in an organic solvent. Alternatively however, any such further material may be added to the metallocene loaded support material in the polymerization reactor or shortly before dosing of the catalyst material into the reactor.

In this regard, as an alternative to an alumoxane it may be preferred to use a fluoroborate catalyst activator, especially a $B(C_6F_5)_3$ or more especially a $^\ominus B(C_6F_5)_4$ compound, such as $C_6H_5N(CH_3)_2H:B(C_6F_5)_4$ or $(C_6H_5)_3C:B(C_6F_5)_4$. Other borates of general formula $(cation^+)_a (borate^-)_b$ where a and b are positive numbers, may also be used.

Both components (I) and (II) may be prepared simultaneously using a dualsite catalyst, i.e. a catalyst carrying two active metallocene sites on a single support, one site designed to give a component (I) and the other designed to give component (II).

The polymerisation is typically conducted in the presence of a diluent. As a diluent, a linear, branched or cyclic saturated hydrocarbon such as butane, propane, pentane, hexane, heptane, octane, cyclohexane or methylcyclohexane may be used.

Polymerisation to produce the polymer for use in the invention may take place in the slurry, solution or gas phase. Slurry phase polymerisation can be conducted under standard slurry conditions.

For slurry reactors, the reaction temperature will generally be in the range 60 to 110° C. (e.g. 80-110° C.), the reactor pressure will generally be in the range 5 to 80 bar (e.g. 25-65 bar), and the residence time will generally be in the range 0.3 to 5 hours (e.g. 0.5 to 2 hours). The diluent used will generally be an aliphatic hydrocarbon having a boiling point in the range −70 to +100° C., especially isobutane or propane.

For solution phase reactors, the reaction temperature used will generally be in the range 130 to 270° C., the reactor pressure will generally be in the range 20 to 400 bar and the residence time will generally be in the range 0.1 to 1 hour. The solvent used will commonly be a hydrocarbon with a boiling point in the range 80-200° C.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer (e.g. ethylene).

In order to ensure that copolymer particles are in the correct size for rotational moulding the products of any polymerisation reaction may be converted to powder form or pelletized to a particle size of approximately 0.1 to 0.5 mm, preferably 0.3 mm using standard technology. Hence, suitably sized pellets may be prepared by grinding.

Alternatively micropellets may be produced using the technique described in WO 00/35646 which is hereby incorporated by reference. By this method a mixture of polyolefin and optionally at least one additive is extruded in melt form through a die and pelletised to give particles having a particular size distribution. The particles are then dried to very low levels of moisture to improve rotomouldability.

Alternatively, the polymerisation, using a dualsite or multisite catalyst, can be set up such that the reactor powder is suitable for use without further manipulation. In one embodiment of the invention rotomoulding may be carried out by combining polymer powder with a masterbatch of UV-stabiliser-loaded polyolefin powder in line with the teaching of WO00/11065 which is hereby incorporated by reference.

The polymer powder or pellets can comprise any standard additives e.g. one or more selected from colouring agents, stabilisers, antioxidants, UV-absorbers, anti-static agents, lubricants and fillers.

Rotational moulding may take place under standard conditions. The polymer powder is placed in the mould which is then transferred to an oven and rotated, preferably about two axes to distribute the polymer powder over the hot surfaces of the mould. The heating cycle is continued until all of the powder has melted and formed a thick, continuous layer within the mould. The mould is then removed from the oven and cooled until the resin has solidified. The moulded part is then removed.

The length of time which the mould must be heated depends on the nature of the article being moulded, the amount of resin present and the temperature of the oven. Typical rotomoulding temperatures are 230° C. to 350° C., more particularly 260° C. to 320° C. Heating time is chosen such that the inner air temperature in the mould is 160° C. to 300° C., more preferably 170° C. to 250° C. This temperature can be measured using a Rotolog® or similar equipment to monitor the temperature or it may be chosen based on previous experience. Cooling may be carried out under a stream of air, water spray or mist or simply in ambient air at room temperature. A combination of these methods may also be employed. Preferably cooling is achieved using a combination of blown air followed by ambient air or just blown air. Cooling times are normally of similar magnitude to heating times or slightly longer. Slow cooling reduces the amount of warpage present in a rotomoulded article however, it is a purpose of the invention to provide polymer compositions which can be cooled more rapidly without increases in warpage compared to conventional single site polymers. The moulded tank may be removed from its mould at any convenient time although it is preferred if it is removed when it has cooled to a temperature of 60° C. to 100° C.

The skilled artisan is able to manipulate the temperature, time and rotation speed/ratio within a rotomoulding apparatus to ensure that well-formed moulded articles are produced.

Particularly preferred rotomoulding conditions are Rotation Speed 9/1.4 RPM; heating for 13 minutes in oven at 270° C.; fan assisted cooling for 10 minutes followed by ambient air cooling for 6 minutes.

The polymer composition of the invention may also have utility outside the field of rotomoulding. It is envisaged that the composition may give benefits in thermoforming due to the broadened processing window which the polymers exhibit. In particular polymer compositions of this type may be useful in the replacement of PVC. The polymer compositions may also be useful in film and injection moulding applications and this forms a yet further aspect of the invention.

EXAMPLE 1

Figure 1:
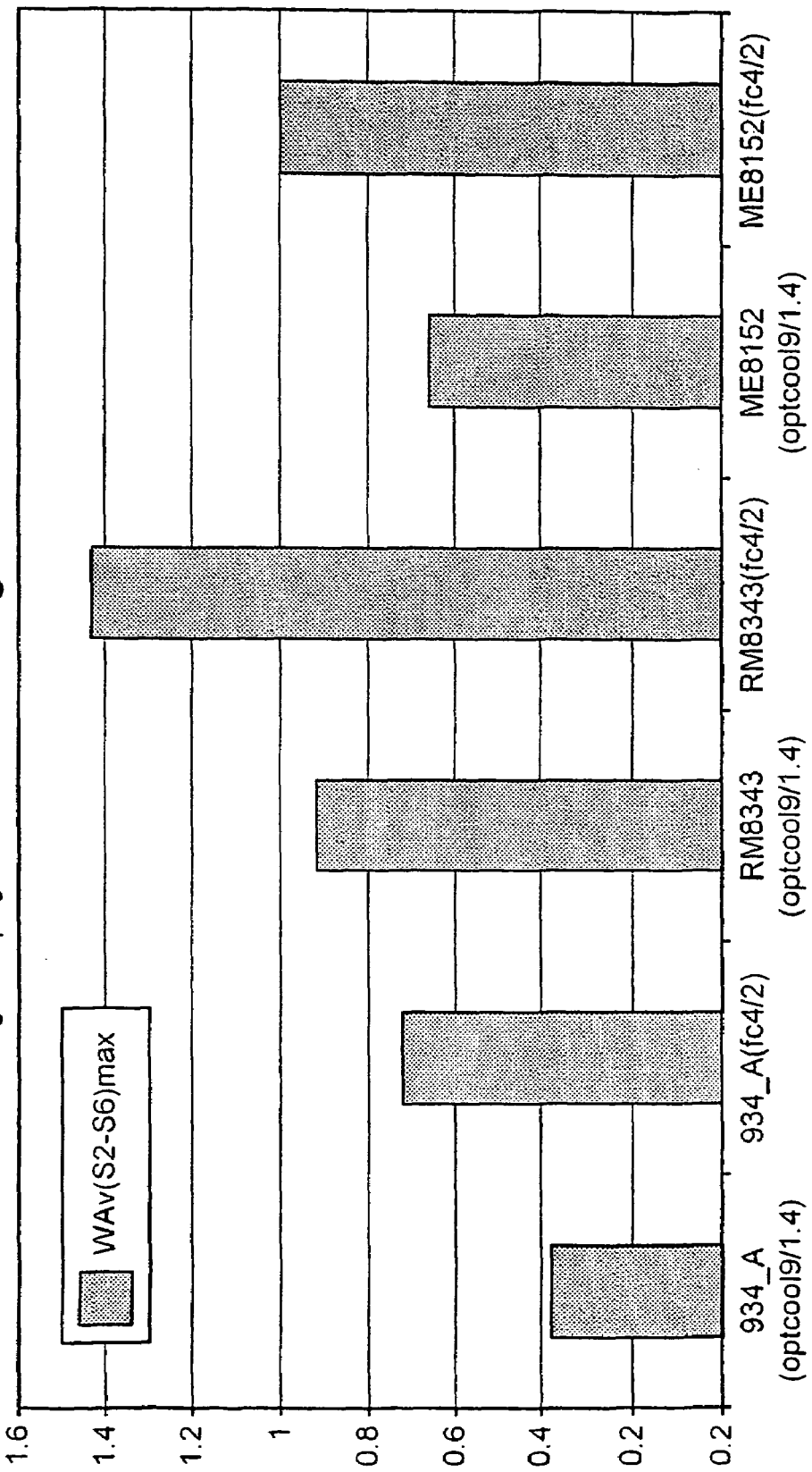
FIG. 1 graphically depicts test results in accordance with Example 3.

Two polymer components A and B were prepared as described in Annex 1 below. The catalyst used was made from (nBu-Cp)ZrCl2 and MAO impregnated on a support of calcined silica. Polymerisations took place in a bench scale semibatch reactor with hydrogen premixed in Component A is an ethylene homopolymer made from a single site catalyst having a density of 0.957 g/cm$^3$, an Mw of 77000, an Mn of 28000 giving a Mw/Mn of 2.7, a melting point of 132° C. and a MFR of 6.

Component B is an ethylene/hexene copolymer having a density of 0.923 g/cm$^3$, a Mw of 67000 and Mn of 31000 giving an Mw/Mn of 2.1, an MFR of 8 and a melting point of 120° C. These components were compounded together, optionally with further polyethylene reactor powders, RP1 and RP2 having a density of 0.934 g/cm$^3$ and an MFR of 6 or a density of 0.939 g/cm$^3$ and an MFR of 6 respectively. The polymer blend was completed by the addition of an antioxidant and a slip agent.

The polymer blends prepared are shown in Table 1 below:

TABLE 1

| Sample | Comp. A | RP1 | RP2 | Comp. B |
|---|---|---|---|---|
| 934Y | 18% | 25% | 57% | — |
| 934A | 64% | — | — | 36% |
| 934B | 32% | 50% | — | 18% |
| 934C | 16% | 75% | — | 9% |
| 934D | 8% | 87.5% | — | 4.5% |
| 934Ref | — | 100% | — | — |

All blends were made to a total of 4 kg which resulted in approximately 3.8 kg of granules. These blends were then ground leaving at least 2.8 kg of powder. The overall density of each blend was 0.934 g/cm$^3$, except 934Y which had a density of 0.940 g/cm$^3$.

In addition, some commercially available polymer grades were readied for rotomoulding.

RM 8403, an ethylene/hexene copolymer available from Borealis A/S, is a polymer produced from a metallocene catalyst having the following properties: Mw=75000, Mn=34000, MWD-=2.2, MFR 6, density 940 g/cm$^3$, melting point 125° C., heat of fusion 194 J/g, cryst Temp 110° C., heat of cryst −158 J/g.

RM 8343, an ethylene/hexene copolymer available from Borealis A/S, is a polymer produced from a metallocene catalyst having the following properties: Mw 76000, Mn=34000, MWD=2.2 MFR 6, density 934 g/cm$^3$, melting point 123° C., heat of fusion 176 J/g, cryst Temp 108° C., heat of cryst −156 J/g.

ME8152, an ethylene/butene copolymer available from Borealis A/S, is a polymer produced from a Ziegler-Natta catalyst having the following properties: Mw 101000, Mn 25000, MWD 4.1, MFR 3.5, density 934 g/cm$^3$, melting point 125° C., heat of fusion 180 J/g, cryst Temp 110° C.

The properties of each blend are further explained in the table below

|  | 934ref | 934A | 934B | 934C | 934D | 934Y |
|---|---|---|---|---|---|---|
| Density | 935.1 | 934.9 | 935.3 | 935.3 | 934.6 | 940.6 |
| Melt pt | 123.4 | 127 | 125 | 124.4 | 123.7 | 127 |
| heat of fusion | 163 | 163 | 164 | 164 | 160 | 182 |
| cryst T | 109 | 112.3 | 110.6 | 110 | 109.6 | 112.6 |
| heat of cryst | −155 | −151 | −153 | −154 | −148 | −173 |

EXAMPLE 2

Samples were rotomoulded under one or more of the following sets of conditions to form boxes.

Rotomoulding Serial 1

No preheating; Rotation Speed 9/1.4 RPM; heating for 13 minutes in oven at 270° C.; fan assisted cooling for 10 minutes followed by 6 minutes ambient cooling in the absence of a fan. 700 g of polymer employed; Max mould temperature 227° C., mould temperature at start 35° C.

Rotomoulding Serial 3

Mould was preheated to 60° C.; Rotation Speed 4/2; heating for 13 minutes in oven at 270°; fan assisted cooling for 30 minutes. 700 g of polymer employed; Max mould temperature 227° C., mould temperature at start 60° C.

The boxes resulting from the rotomoulding were cubes having sides of approximately 20 cm. The edges of the boxes were trimmed.

EXAMPLE 3

Warpage of the rotomoulded boxes was measured on five of the six cube walls (not the top wall). A ruler with a micrometer was used diagonally on each side of the box. Results are depicted in Table 2 relative to results achieved with ME8152.

TABLE 2

| Box | Average Warpage |
|---|---|
| ME8152 - Roto Serial 3 | 100% |
| ME8152 - Roto Serial 1 | 66% |
| RM8343 - Roto Serial 3 | 143% |
| RM8343 - Roto Serial 1 | 92% |
| 934A - Roto Serial 3 | 72% |
| 934A - Roto Serial 1 | 38% |

These results are graphically depicted in FIG. 1.

EXAMPLE 4

Thickness variation in the walls of the boxes was measured by taking five wall thickness measurements from each side of the boxes. Average thickness variation is standard deviation for all points of each box relative to ME8152. The results are depicted in Table 3 below.

TABLE 3

| Box | Thickness variation |
|---|---|
| ME8152 - Roto Serial 3 | 100% |
| ME8152 - Roto Serial 1 | 38% |
| RM8343 - Roto Serial 3 | 115% |
| RM8343 - Roto Serial 1 | 33% |
| 934A - Roto Serial 3 | 53% |
| 934A - Roto Serial 1 | 59% |

The figures used to produce these tables are as follows:

| sample | 934A | 934A | RM8343 | RM8343 | ME8152 | ME8152 |
|---|---|---|---|---|---|---|
| warpage | 0.938 | 1.78 | 2.264 | 3.55 | 1.63 | 2.47 |
| thckns | 3.44 | 3.53 | 3.54 | 3.58 | 3.49 | 3.64 |

(In which columns 1, 3 and 5 comprise rotomoulding Serial 1 results and columns 2, 4 and 6 comprise rotomoulding serial 3 results).

phological changes. The appearance of the boxes made with 934A was also improved and fewer air bubbles are formed in the rotomoulded article.

EXAMPLE 5

Mechanical Properties. The following tests were employed to test the mechanical properties of the boxes produced.

Tensile Modulus: ISO527-1 (1993)

Instrument Falling Weight (IFW) ISO 6603-2: 1989

Circular disks with diameter 60 mm are used with a hemispherical striker of mass 10 kg and 20 mm diameter. Falling height 1 m at a velocity of 4.4 m/s at −20° C. Rupture was ductile.

ESCR—ASTM D1693-97/ISO 1872-2: 1997

Standardised specimens are notched and stressed before being lowered into a solution of detergent at 50° C. (Detergent 10% Antarox (Igepal) CO-630. Specimen thickness 2 mm. Examination every 4 hours and calculation is based on probability of 50% broken samples.

Density—ISO 1183: 1987

| | | | 934 Ref | 934 A | 934 B | 934 C | 934 D | 934 Y | RM8343 | RM8403 | ME8152 |
|---|---|---|---|---|---|---|---|---|---|---|---|
| | | | Mechanical data: | | | | | | | | |
| ESCR Series 1 9/1,4 13-10-6 | 10% F50 | | | 33 | 24 | 21 | 25 | 36 | 10 | | |
| Tensile properties | Tensile modulus | Mpa | 620 | 680 | 660 | 650 | 620 | 800 | 585 | 710 | 600 |
| | Stress at yield | Mpa | 18 | 18 | 18 | 18 | 18 | 21.5 | 17.5 | 20 | 17 |
| | Strain at yield | % | 13 | 11 | 12 | 12 | 12 | 11 | 13 | 12 | 13 |
| FWI at −20° C. | Max force | N/mm | 1430 | 1390 | 1400 | 1410 | 1410 | 1470 | 1425 | 1490 | 1310 |
| | Total energy at break | J | 19 | 19 | 19 | 19 | 19 | 19 | 19 | 20 | 15 |
| | Total deformation | mm | 24 | 24 | 24 | 25 | 24 | 23 | 24 | 23 | 22 |
| Density | | | 937.2 | 937.4 | | | | | 936 | | 933.4 |
| Series 2 9/1,4 13-30 | | | | | | | | | | | |
| Tensile properties | Tensile modulus | Mpa | 630 | 670 | 630 | | | 755 | | 740 | 610 |
| | Stress at yield | Mpa | 18 | 18 | 18 | | | 21 | | 20.5 | 17 |
| | Strain at yield | % | 12 | 11 | 12 | | | 11 | | 13 | 13 |
| FWI at −20° C. | Max force | N/mm | 1440 | 1420 | 1420 | | | 1470 | | 1480 | 1320 |
| | Total energy at break | J | 19 | 19 | 19 | | | 19 | | 18 | 16 |
| | Total deformation | mm | 24 | 24 | 24 | | | 23 | | 23 | 22 |
| Series 3 4/2 13/30 | | | | | | | | | | | |
| Tensile properties | Tensile modulus | Mpa | 640 | 700 | 670 | 680 | 645 | 795 | 615 | 705 | 600 |
| | Stress at yield | Mpa | 18 | 18 | 18 | 18.5 | 18 | 22 | 17.5 | 20 | 16.5 |
| | Strain at yield | % | 11.5 | 11 | 12 | 12.5 | 11 | 12.5 | 12.5 | 11 |
| FWI at −20° C. | Max force | N/mm | 1220 | 1190 | 1190 | 1210 | 1210 | 1270 | 1200 | 1260 | 1100 |
| | Total energy at break | J | 17 | 17 | 17 | 17 | 17 | 17 | 16 | 16 | 13 |
| | Total deformation | mm | 24 | 25 | 24 | 24 | 24 | 24 | 24 | 24 | 23 |
| Density | | | 936.8 | 937 | | | | | 935.7 | | 927.5 |

934Y has the most favourable tensile and impact properties but has lower ESCR. Overall, compositions of the invention show improved warpage, stiffness, morphology and comparable or improved ESCR. Grade 934A has also been found to have increased high temperature stiffness.

Discussion

Blends with the broadest comonomer distribution have significantly less warpage and thickness variation than the reference materials. Moreover, an analysis of the crystal lattice structure of 934A reveals a much finer crystal structure which should make the material more robust to mor-

EXAMPLE 6

Figure 2:
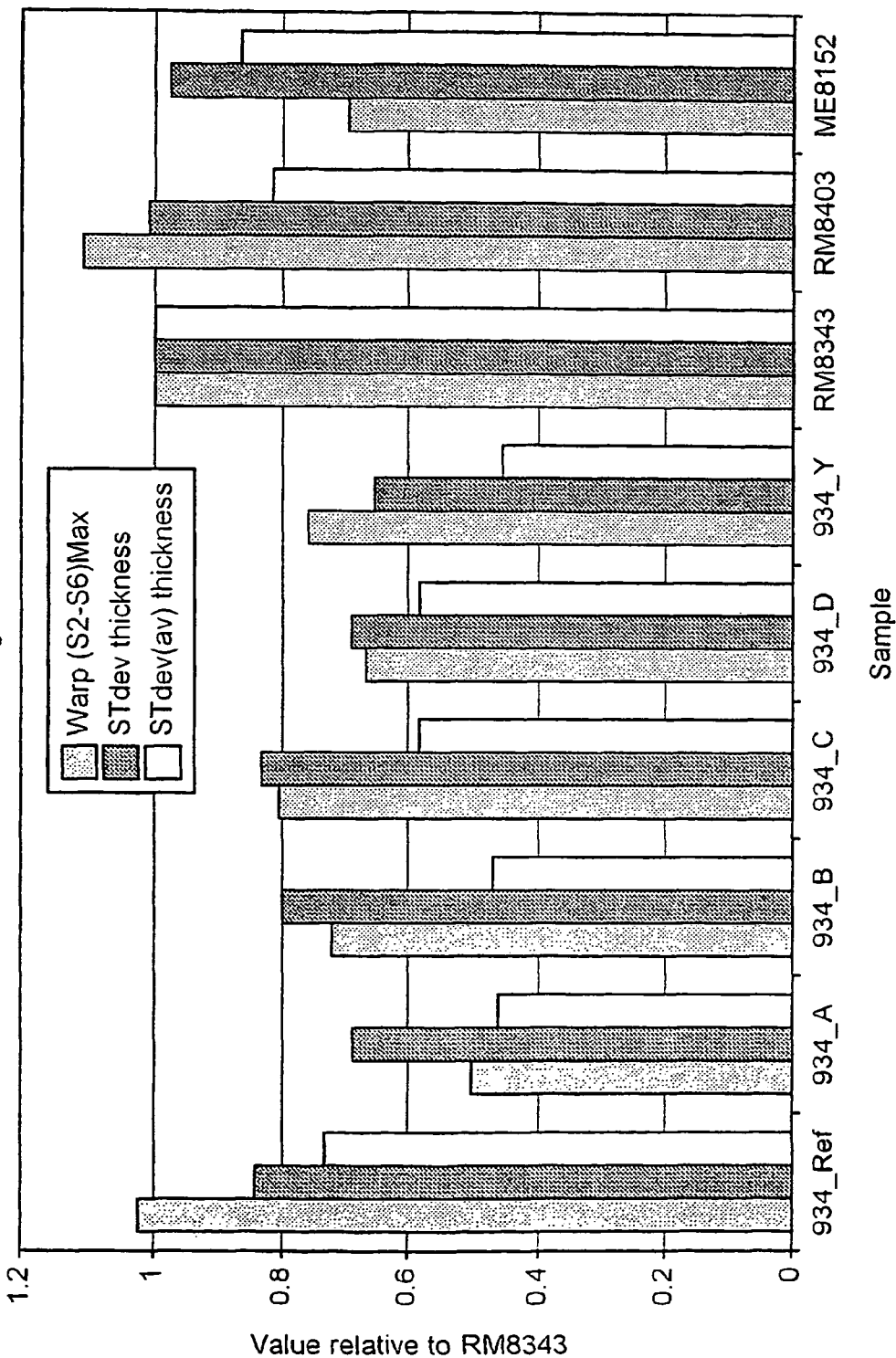
FIG. 2 graphically depicts test results in accordance with Example 6.
The invention will now be further illustrated with reference to the following non-limiting examples and figures.

The warpage and thickness data (in mm) for rotomoulding serial 1 with all blends is displayed in the first two tables below. Data for serial 3 is displayed in the further two tables. These results are graphically depicted in FIG. 2.

Roto Serial 1 Results

| sample   | 934Ref | 934A  | 934B | 934C  | 934D  | 934Y  |
|----------|--------|-------|------|-------|-------|-------|
| warpage  | 2.226  | 0.938 | 1.54 | 1.706 | 1.734 | 1.842 |
| thckns   | 3.51   | 3.44  | 3.48 | 3.52  | 3.47  | 3.411 |

| sample  | RM8343 | RM8403 | ME8152 |
|---------|--------|--------|--------|
| warpage | 2.264  | 2.272  | 1.626  |
| thckns  | 3.54   | 3.40   | 3.49   |

Roto Serial 3 Results

| sample   | 934Ref | 934A | 934B | 934C | 934D | 934Y  |
|----------|--------|------|------|------|------|-------|
| warpage  | 3.642  | 1.78 | 2.56 | 2.87 | 2.37 | 2.712 |
| thckns   | 3.52   | 3.53 | 3.59 | 3.53 | 3.54 | 3.47  |

| sample  | RM8343 | RM8403 | ME8152 |
|---------|--------|--------|--------|
| warpage | 3.548  | 3.946  | 2.474  |
| thckns  | 3.58   | 3.44   | 3.64   |

As will be seen, the warpage results for the compositions 934Y, 934A, 934B, 934C and 934 D are better than the results obtained using the available commercial grades.

EXAMPLE 7

The following metallocenes are used in this example. $Me_2Si(9Flu)_2ZrCl_2$ (A-metallocene) which produces amorphous atactic polypropylene and rac $Me_2Si(2MeIndenyl)_2ZrCl_2$ (B-metallocene) which produces isotactic polypropylene. These catalysts are available from Boulder.

Dualsite Catalyst Preparation

Preparation of catalyst "60/40" in the Table in Example 8—A pretreated silica carrier, calcined at 600° C. was transferred to a small bottle with stirrer bar. The carrier was wetted with toluene (5.5 ml per 2 g carrier). A solution of 2.5 ml of 30% MAO in toluene, 38.4 mg of A-metallocene and 33.4 mg of B-metallocene was prepared and stirred for 30 mins. This solution is added dropwise to 5.5 ml of toluene containing 2 g of silica carrier and stirred for 20 minutes and left overnight. The catalyst is then dried in nitrogen for 2 hours at 40° C., The other catalysts in Example 8 were made analogously to "60/40" maintaining the total molar metallocene concentration constant.

EXAMPLE 8

The dry catalyst is fed into a 2 L reactor under nitrogen. 650 ml propylene is added to the reactor and prepolymerisation is initiated for 8 minutes at 15° C. The temperature is rapidly raised to 70° C. and polymerisation takes place in the absence of hydrogen. The reactor conditions are described in the Table below.

| Run no | Temp. ° C. | Time   | $H_2$ | mg cat | weight polymer | Extra TEA, 1M (A54) | Dual site catalyst in mol % (B/A) |
|--------|------------|--------|-------|--------|----------------|---------------------|-----------------------------------|
| 6301   | 70° C.     | 40 min | 0     | 220    | 200 g          | 0.3 ml              | 100/0                             |
| 6303   | 70° C.     | 60 min | 0     | 200    | 15 g           | 0.1 ml              | 0/100                             |
| 6314   | 70° C.     | 30 min | 0     | 230    | 190 g          | 0.25 ml             | 90/10                             |
| 6315   | 70° C.     | 30 min | 0     | 210    | 190 g          | 0.25 ml             | 60/40                             |
| 6316   | 70° C.     | 60 min | 0     | 230    | 130 g          | 0.25 ml             | 20/80                             |
| 6317*  | 70-80° C.  | 55 min | 0     | 210    | 175 g          | 0.3 ml              | 20/80                             |

|                         | Mw      | Mn      | MWD |
|-------------------------|---------|---------|-----|
| 6301 whole polymer      | 185 000 | 82 000  | 2, 3|
| 6301 crystalline phase. | 185 000 | 82 000  | 2, 3|
| 6303 whole polymer      | 190 000 | 55 000  | 3, 3|
| 6303 XS phase           | 185 000 | 55 000  | 3, 3|
| 6314 whole polymer      | 190 000 | 80 000  | 2, 4|
| 6314 crystalline phase. | 190 000 | 80 000  | 2, 4|
| 6315 whole polymer      | 210 000 | 80 000  | 2, 6|
| 6315 crystalline phase  | 210 000 | 100 000 | 2, 1|
| 6316 whole polymer      | 240 000 | 105 000 | 2, 2|
| 6316 crystalline phase  | 230 000 | 105 000 | 2, 2|

Results

The properties of the resulting polymers are described in the table above. The polymer components produced form a composition which is expected to be ideal for rotomoulding due to the almost identical Mw and Mn values but differing melting point properties of the isotactic and amorphous components.

Runs 6316 and 6317 give rise to a polymer composition having xylene soluble fractions of 16 and 19 wt % respectively. (The polymer is boiled in xylene at 137° C. for 30 minutes, cooled filtered and the crystalline phase precipitated). The polymer compositions are surprisingly free-flowing powders and it is believed that never before have free flowing polypropylene polymer compositions been prepared having such high xylene soluble fractions. This forms a further aspect of the invention. The high xylene soluble fraction is believed to give rise to a softer polymer which may warp less on rotomoulding.

Thus viewed from a further aspect the invention provides a free-flowing polypropylene homopolymer powder having a xylene soluble fraction of at least 7 wt %, preferably at least 12 wt %. Preferably said powder is produced in a polymerisation stage by a catalyst system comprising two different active sites.

Viewed from another aspect the invention provides a free flowing propylene homo or copolymer powder comprising components A and B wherein:

Component A has a crystalline melting point; and

Component B has a melting point at least 10° C. lower than that of component A, preferably 30° C., especially component B is amorphous, has an Mn of at least 25000 g/mol. preferably at least 40000 g/mol and has a comonomer content of less than 20 wt %, preferably less than 5 wt %;

said powder having an Mw of at least 75000 g/mol, a xylene soluble fraction of at least 7 wt %, preferably at least 12 wt %.

The catalyst used to manufacture said free flowing powder is also new. Thus viewed from another aspect the invention provides a solid, preferably supported multisite catalyst comprising two metallocenes A' and B';

metallocene A' comprising two optionally substituted indenyl groups bridged via the 1-position of the indenyl, said metallocene having $C_2$ symmetry and preferably comprising a group 4A metal and a methyl substituent at the 2-position of each ring;

metallocene B' comprising two optionally substituted η5 ligands, at least one of which is a fluorenyl ligand bridged via the 9-position of the fluorenyl, said metallocene B' having $C_s$ symmetry and preferably comprising a group 4A metal. In a further preferred embodiment, both η-5 ligands are fluorenyl ligands.

EXAMPLE 9

Two polymer components RM8343 and component A' were prepared. Component A' is an ethylene homopolymer prepared in an identical fashion to Component A.

Polymer blends are prepared as shown in Table 4 below

TABLE 4

| Test | Unit | RM8343 | 50/50* | Comp A' |
|------|------|--------|--------|---------|
| density | kg/m3 | 934.5 | 945 | 960.7 |
| melt pt | ° C. | 123.7 | 129.4 | 134.4 |
| tens mod | MPa | 620 | 950 | 1330 |
| warpage | mm | 2.2 | 1.3 | deformed |

*50/50 mix of RM8343 and Comp A'.

Warpage was tested by following the procedure of Rotomoulding Serial 1 except oven heating was carried out for 14 mins, fan cooling for 16 mins with no subsequent air cooling.

The results show that the combination of RM8343 and Comp A' results in a surprisingly low level of warpage. Moreover, the tensile modulus of the blend is still high giving excellent stiffness, an ideal property for rotomoulding.

and

II) an ethylene copolymer with at least one other $C_{3-10}$ α-olefin, having a melt flow rate of within 40% of the melt flow rate of component (I), a molecular weight distribution of (Mw/Mn) of less than 4, an Mw of within 30% of the Mw of component (I), a density of 0.880 g/cm$^3$ to 0.940 g/cm$^3$ said density being at least 0.010 g/cm$^3$ less than the density of component (I) and a melting point of at least 5° C. less than that of component (I)

wherein (I) and (II) are both formed by single site catalysts.

2. An article as claimed in claim 1 wherein the melting point of component II is at least 10° C. less than that of component (I).

3. An article as claimed in claim 2 wherein component (II) is an ethylene copolymer with butene, hexene or octene.

4. An article as claimed in claim 3 wherein component (II) is an ethylene copolymer with hexene.

5. An article as claimed in claim 2 wherein the melt flow rates of components (I) and (II) are 4 to 10 g/10 min.

6. An article as claimed in claim 5 wherein the melt flow rates of components (I) and (II) 6 to 8 g/10 min.

7. An article as claimed in claim 2 wherein the molecular weight distribution of the composition is less than 4.

8. An article as claimed in claim 2 wherein the density of component (II) is 0.910 g/cm$^3$ to 0.930 g/cm$^3$.

9. An article as claimed in claim 2 wherein the density of composition is in the range 0.925 to 0.950 g/cm$^3$.

10. An article as claimed in claim 9 wherein the density of composition is in the range 0.930 to 0.940 g/cm$^3$.

11. An article as claimed in claim 2 wherein the melting point of component (I) is in the range 125° C. to 135° C. and the melting point of component (II) is in the range 100° C. to 125° C.

12. An article as claimed in claim 1 wherein the molecular weight distribution each of components (I) and (II) is less than 3.

Annex 1
PREPARATION OF COMPONENTS A & B USING (nBu-Cp)$_2$ZrCl$_2$/MAO ON SILICA

| | COMPONENT A | | | | COMPONENT B | | | |
|---|---|---|---|---|---|---|---|---|
| Cal temp (° C.)/Loading (%) | 600/100 | 600/100 | 600/100 | 600/100 | 600/100 | 600/100 | 600/100 | 600/100 |
| IMP | Dry-mix | Dry-mix | Dry-mix | Dry-mix | Dry-mix | Dry-mix | Dry-mix | Dry-mix |
| Reac temp | 94 | 94 | 94 | 94 | 85 | 85 | 85 | 85 |
| Reac pres (bar) | 25.5 | 25.5 | 25.5 | 25.5 | 23.1 | 23.1 | 23.1 | 23.1 |
| Etene partial pressure (bar) | 7.5 | 7.5 | 7.5 | 7.5 | 7.5 | 7.5 | 7.5 | 7.5 |
| Eten H2 ratio (ppmH2) | 420 | 420 | 420 | 420 | 650 | 650 | 650 | 440 |
| C6/Etene-Cascade (Wt % C8) | 0.00 | 0.00 | 0.00 | 0.00 | 6.00 | 6.00 | 6.00 | 6.00 |
| TOTAL RUN TIME (min) | 60 | 60 | 60 | 60 | 60 | 60 | 60 | 60 |
| MFR2 (powder) | 6.1 | 6.4 | 6.8 | 6.2 | 8.1 | 8.5 | 8.3 | 6.5 |
| MFR21 (powder) | 95 | 105 | 121 | 103 | 123.0 | 122 | 120 | 110 |
| FFR (powder) | 15.6 | 16.4 | 17.8 | 16.6 | 15.2 | 14.4 | 14.5 | 16.9 |
| DENSITY (powder kg/dm3) | 0.9573 | 0.9577 | 0.9563 | 0.9568 | 0.9224 | 0.9214 | 0.9216 | 0.9245 |

The invention claimed is:

1. A rotomoulded article formed from a polymer composition comprising
I) an ethylene homopolymer, having a melt flow rate of 0.5 to 30 g/10 min, a molecular weight distribution (Mw/Mn) of less than 4, an Mw of 50,000 to 110,000, a density of 0.940 g/cm$^3$ to 0.970 g/cm$^3$ and a melting point of 100 to 145° C.;

13. An article as claimed in claim 1 wherein the ratio of component (I) to (II) is from 4:1 to 1:4.

14. A process for the preparation of a rotomoulded article comprising rotomoulding a composition comprising
I) an ethylene homopolymer, having a melt flow rate of 0.5 to 30 g/10 min, a molecular weight distribution (Mw/Mn) of less than 4, an Mw of 50,000 to 110,000, a density of 0.940 g/cm$^3$ to 0.970 g/cm$^3$ and a melting point of 100 to 145° C.; and II) an ethylene copolymer with at least one other $C_{3-10}$ α-olefin, having a melt flow rate of within 40% of the melt flow rate of component (I), a molecular weight distribution of (Mw/Mn) of less than 4, an Mw of within 30% of the Mw of component (I), a density of 0.880 g/cm$^3$ to 0.940 g/cm$^3$ said density being at least 0.010 g/cm$^3$ less than the density of component (I) and a melting point of at least 5° C. less than that of component (I)

wherein components (I) and (II) are both formed by single site catalysts.

15. A process as claimed in claim 14 wherein rotomoulding is effected at a rotation speed of 9/1.4 RPM; heating for 13 minutes in oven at 270° C.; fan assisted cooling for 10 minutes followed by 6 minutes ambient cooling in the absence of a fan.

16. A rotomoulded article as claimed in claim 1 wherein components (I) and (II) are made using metallocene catalysis.

* * * * *